W. G. DANIELSEN.
GEAR FOR CONNECTING AND GUIDING GANG PLOW FRAMES.
APPLICATION FILED DEC. 16, 1910.
1,068,570.
Patented July 29, 1913.
4 SHEETS—SHEET 1.
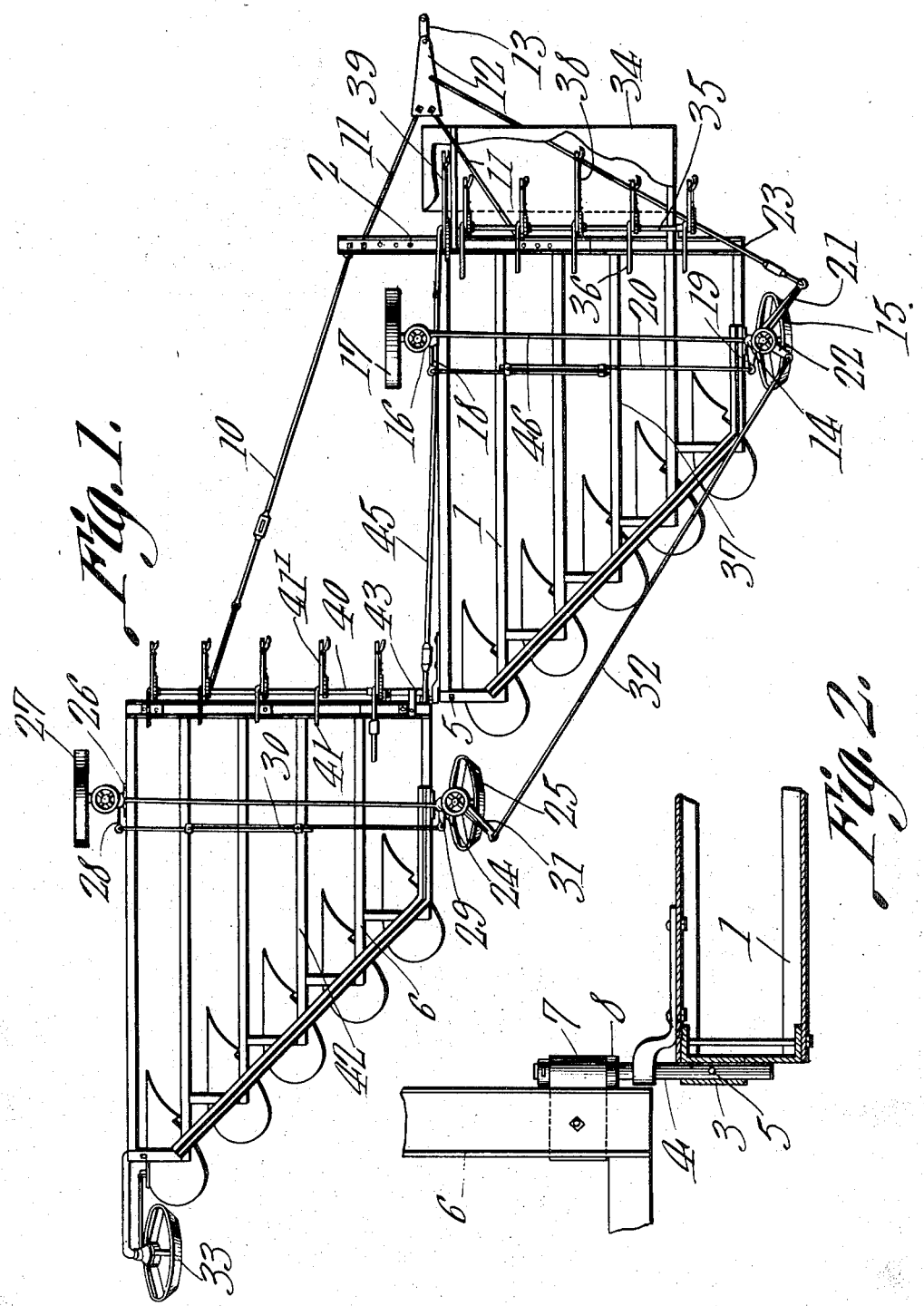
Witnesses
Wilhelm G. Danielsen
Inventor
by C. A. Snow & Co.
Attorneys

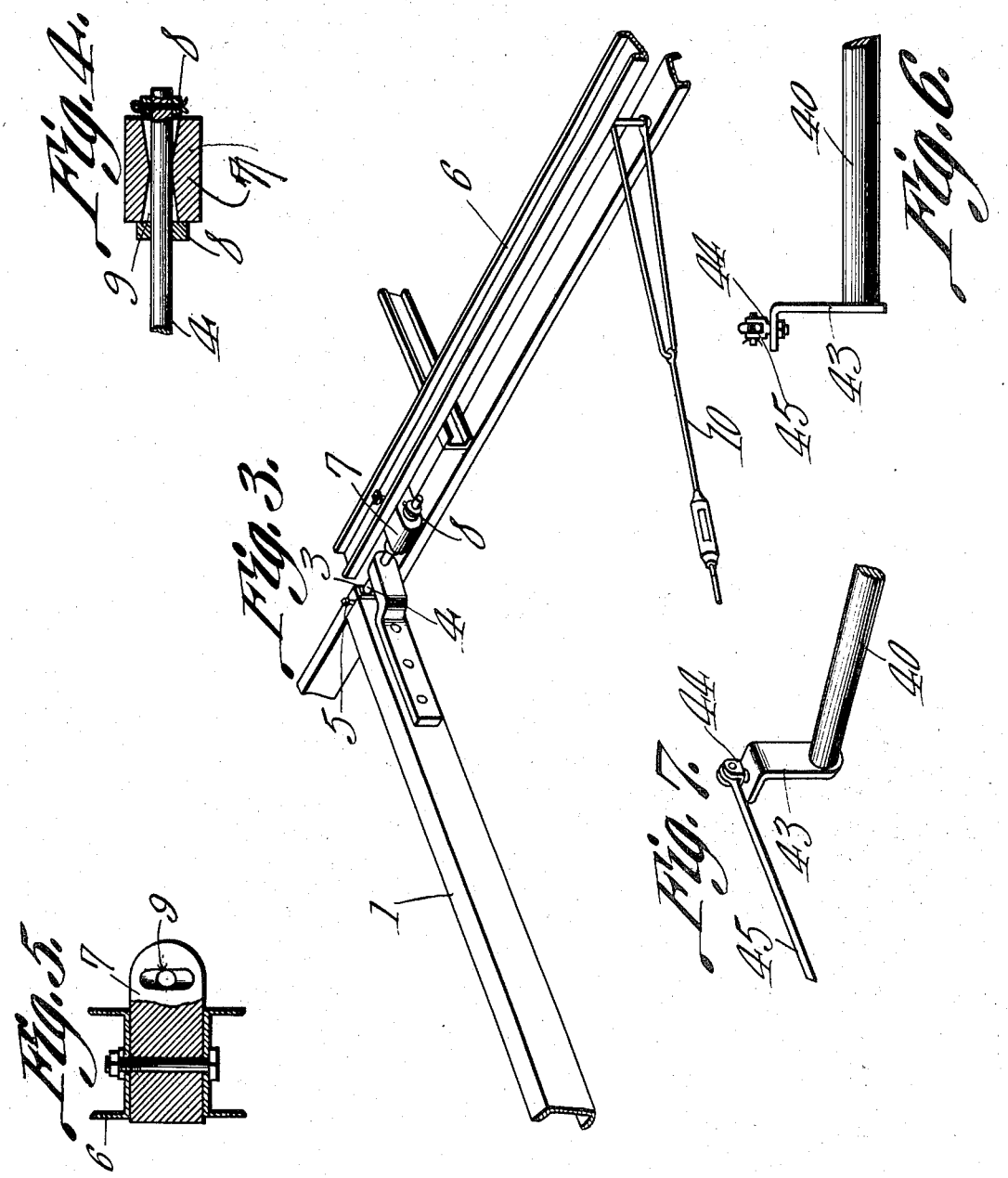

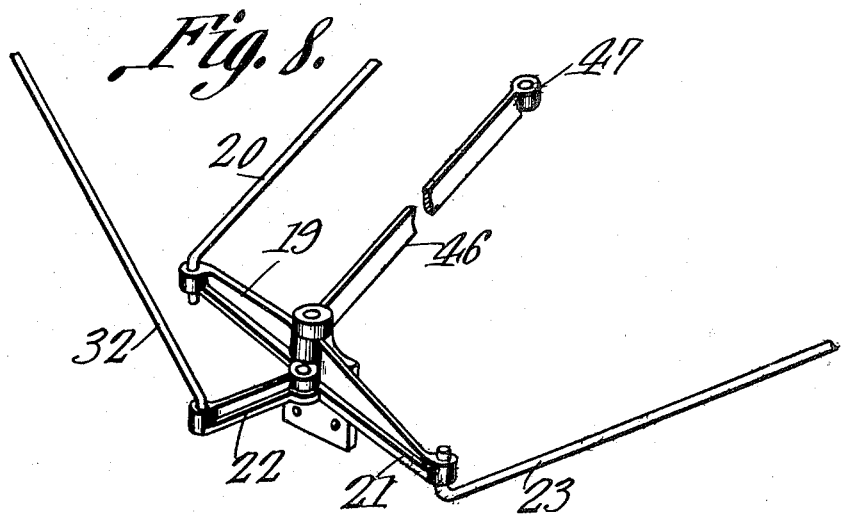
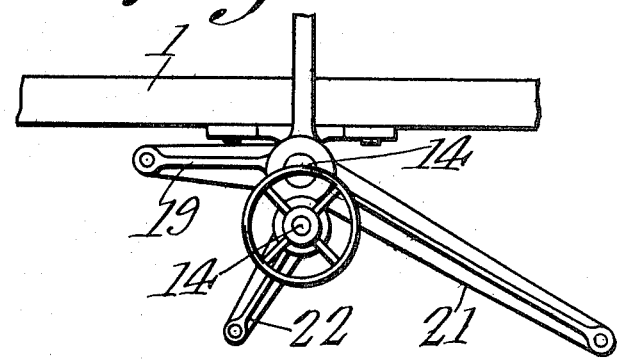
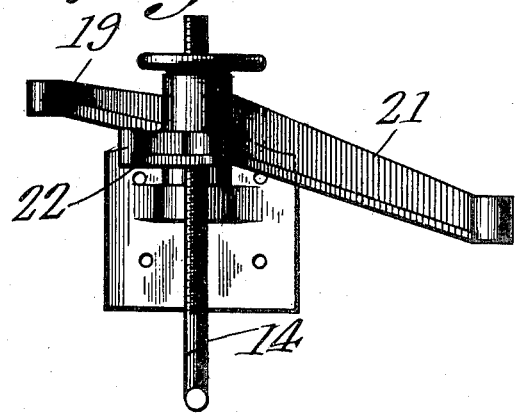

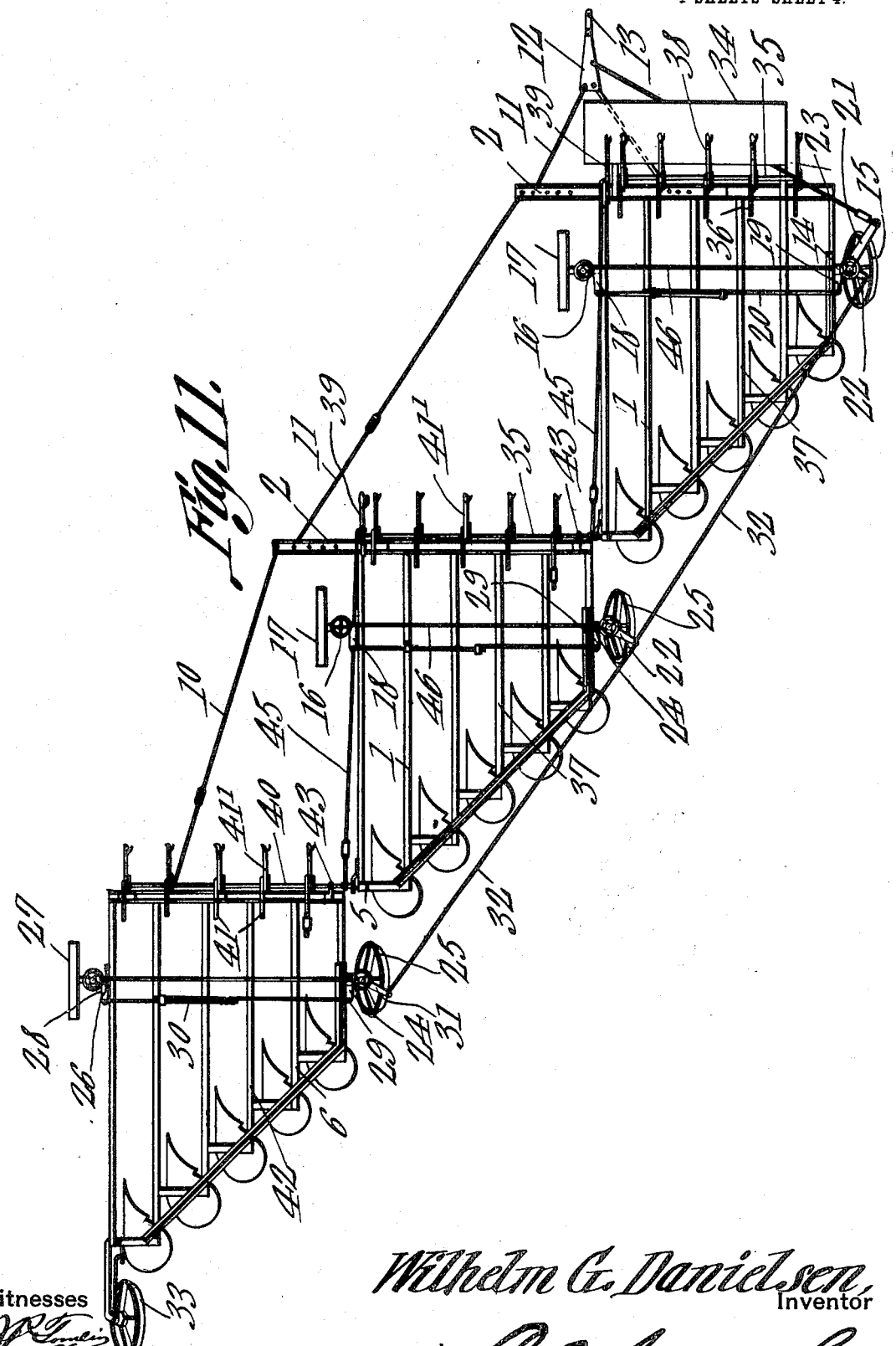

UNITED STATES PATENT OFFICE.

WILHELM G. DANIELSEN, OF INDEPENDENCE, MISSOURI.

GEAR FOR CONNECTING AND GUIDING GANG-PLOW FRAMES.

1,068,570.  Specification of Letters Patent.  Patented July 29, 1913.

Application filed December 16, 1910. Serial No. 597,668.

*To all whom it may concern:*

Be it known that I, WILHELM G. DANIELSEN, a citizen of the United States, residing at Independence, in the county of Jackson and State of Missouri, have invented a new and useful Gear for Connecting and Guiding Gang-Plow Frames, of which the following is a specification.

This invention has relation to devices for connecting and guiding gang plow frames and it consists in the novel construction and arrangement of its parts as hereinafter described and claimed.

The object of the invention is to provide a simple and an effective means for connecting gang plow frames together in such manner that the said frames may have pivotal movement with relation to each other and at the same time the draft strain is distributed among the series of frames. Also means are provided for steering the forward furrow wheels and the land side wheels of all of the gang frames and an operator's platform is located upon the foremost frame of the series and lever mechanisms are located within reach of one standing upon the platform whereby the gang of beams of any particular frame may be raised or lowered.

The means for raising or lowering the beams of a succeeding gang frame consists in providing upon the said frame a shaft having a crank arm to which the plow beams are connected and are raised or lowered as the said shaft is turned upon its axis. The crank of the shaft is located approximately vertically above the pivotal connection between the gang frames and a lever mechanism is mounted upon the preceding gang frame and is operatively connected with the said crank arm above the said pivotal connection between the frames. By so locating the pivotal connection between the lever and the arm of the crank shaft, the said shaft is not affected by the pivotal or relative swinging movement of the gang frames and consequently the beams of the plows are not affected by such relative movement on the part of the frames.

In the accompanying drawings—Figure 1 is a top plan view showing two gang frames connected together by the gear. Fig. 2 is a detailed view of the means for pivotally connecting one frame with another. Fig. 3 is a perspective view of the rear portion of a preceding frame connected with the forward portion of a succeeding frame. Fig. 4 is a vertical sectional view through a bearing which is mounted upon the succeeding frame and which receives a stud upon the preceding frame and forming the pivotal connection between the frames. Fig. 5 is a horizontal view of said bearing. Fig. 6 is a front elevation of a portion of the shaft used upon a succeeding frame. Fig. 7 is a perspective view of a portion of the said shaft. Figs. 8, 9 and 10 are detailed views of portions of the steering gear for the furrow and land side wheels of the several frames. Fig. 11 is a top plan view showing a series of three gang frames connected together by the gear.

The preceding gang frame 1 is provided at its forward end with a cross beam 2 the end of which projects to some extent in a landwise direction beyond the side of the said frame 1. A sleeve 3 is fixed to the rear end of the frame 1 and at the land side thereof and is provided with an approximately horizontal opening which receives the end portion of a stud 4. The said stud 4 is secured in an adjusted position in the sleeve 3 by means of a set screw 5 which passes transversely through the side of the said sleeve and at its inner end bears against the side of the said stud. A succeeding frame 6 is provided at its forward end and at its furrow side with a bearing 7 which receives the projecting end portion of the stud 4. The bearing 7 loosely receives the stud 4 so that the frame 6 may swing vertically with relation to the frame 1 and vice versa. Collars 8 are secured to the stud 4 at the opposite ends of the bearing 7 and serve as means for preventing the said stud from moving longitudinally within the said bearing. The opening through the bearing 7 at its upper and lower sides and toward its ends is flared as at 9 in order that the bearing 7 may rock upon the said stud in a plane passing vertically through the axis of the stud. By such means of connecting the preceding and succeeding gang frames together it will be seen that the said frames may not only swing vertically with relation to each other in the line of draft but the said frames may swing vertically at right angles to the line of draft. This affords a flexible means for connecting the several frames together.

A rod 10 is connected at its forward end with the land side projecting end portion of the beam 2 and at its rear end with the succeeding frame 6 in the vicinity of the land side edge thereof. Draft rods 11 are connected with the beam 2 one at the projecting end portion thereof and the other at a point between the land and furrow edges of the frame 1 and the said rods 11 converge toward each other at their forward ends and are pivotally secured to a draft plate 12 at different points. A clevis 13 is pivotally connected with the draft plate 12 and serves as means for connecting the series of gang frames with the frame of a traction engine or other draft means. A vertically disposed shaft 14 is journaled at the furrow edge of the frame 1 and a furrow wheel 15 is journaled upon the lower end portion of the said shaft and is pitched at an angle to a vertical plane as is usual in such wheels. A vertically disposed shaft 16 is journaled at the land side edge of the frame 1 and a land side wheel 17 is journaled at the lower end of the said shaft 16. An arm 18 is fixed to the upper end of the shaft 16 and an arm 19 is fixed to the upper end of the shaft 14. A longitudinally extensible rod 20 connects the arms 18 and 19 together so that they are caused to swing in unison about the respective shafts to which they are attached. Arms 21 and 22 are rigid with the arm 19 and in practice the three said arms are made in one integral piece. A rod 23 is connected at its rear end to the forward end portion of the arm 21 and at its forward end is connected with the draft plate 12 at a point between the forward and rear ends of the said plate. A vertically disposed shaft 24 is journaled at the furrow edge of the frame 6 and a furrow wheel 25 is journaled at the lower end of the shaft 24. The said wheel 25 is also pitched at an angle to a vertical plane. A vertically disposed shaft 26 is journaled at the land side edge of the frame 6 and a land side wheel 27 is journaled at the lower end of the said shaft 26. An arm 28 is fixed to the upper end of the shaft 26 and an arm 29 is fixed to the upper end of the shaft 24. A longitudinally extensible rod 30 pivotally connects the arms 28 and 29 together whereby the said arms are constrained to rotate in unison about the axes of their respective shafts. An arm 31 is rigid with the arm 29 and in practice is made integral with the same. A rod 32 is pivotally connected at its forward end with the arm 22 and at its rear end with the arm 21. The rear portion of the succeeding frame 6 is supported upon a rear furrow wheel 33 in any appropriate manner. Thus it will be seen that the rear portion of the preceding frame 1 is supported upon the forward portion of the succeeding frame 6 and the said frames have such flexible connection as to enable their respective soil engaging members to properly operate in the soil. Furthermore it will be seen that when draft strain is applied to the plate 12 through the clevis 13, the said strain is transmitted through the rods 11 to the cross beam 2 of the preceding frame 1, at the land side edge portion thereof, also the said draft strain is transmitted through the frame 1 to the furrow side edge portion of the frame 6 and through the rod 10 to the land side edge portion of the frame 6. Thus the draft strain is applied to the frame 6 at the opposite sides of the pivotal connection between the said frame 6 and the frame 1. Again it will be seen that as the plate 12 is swung to one side or the other horizontally the rod 23 will be moved longitudinally and through the arm 21 the shaft 14 will be turned upon its axis and through the connecting parts the shaft 16 will be similarly turned. This will cause the furrow wheel and the land side wheel 17 to maintain constant relation to the draft plate 12. At the same time the arm 22 swings about the axis of the shaft 14 and the rod 32 is moved longitudinally which in turn swings the arm 31 about the axis of the shaft 24 and the wheel 25 together with the wheel 27 are turned about the axes of their respective shafts and are also held in predetermined relative relation to the plate 12 and the furrow and land side wheels of the preceding frame. Thus means are provided for steering the forward wheels and land side wheels of the members of the set of gang frames in unison with the draft plate 12.

An operator's platform 34 is mounted at the forward edge of the preceding frame 1 and a shaft 35 is journaled upon the said frame. Rods 36 are pivotally connected with the forward ends of plow beams 37. Lever mechanisms 38 are provided for moving the rods 36 longitudinally and the said levers 38 are within reach of one standing upon the platform 34. A lever 39 is fulcrumed upon the forward portion of the frame 1 and is within reach of one standing upon the platform 34. A shaft 40 is journaled upon the forward portion of the succeeding frame 6 and rods 41 are pivotally connected with the forward ends of plow beams 42 and at their forward ends are pivoted to levers 41' mounted upon the shaft 40. The shaft 40 is provided at its inner end with a crank arm 43 upon which is swiveled a bracket 44. The rear end of a rod 45 is pivoted to the bracket 44 and the said rod at its forward end is pivoted to the lever 39 fulcrumed upon the frame 1. When the gang frames are drawn over the surface of the ground and the plows are in contact with the soil the swiveled bracket 44 is located approximately vertically above the bearing 7 about midway between the ends of the opening therein that receives the stud 4 and by reason of the fact that the said bracket 44 is a pivotal connection that attaches the rod 45 to the crank 43 of the shaft 40 and is in close proximity to the bearing 7 as indicated the relative swinging movement of the frames 1 and 6 will occur approximately coincident with the bracket 44 as a pivot and therefore such movement will not have a tendency to rock the shaft 40 as the location of the swiveled bracket 44 at another relative position may do. That is to say the lever 39 is held in a fixed position and the rod 45 is inflexible and therefore the pivotal connection between the rod 45 and the arm 43 of the shaft 40 should be as near as possible the pivotal connection between the stud 4 and the bearing 7 in order that the swinging or rocking movement of the frames 1 and 6 will not affect or tend to turn the shaft 40 in its bearings upon the frame 6. By this arrangement a flexible connection is established between the lever 39 and the shaft 40 and at the same time there is sufficient rigidity from the lever 39 when held in a fixed position through the rod 45 to properly hold the shaft 40 against turning in its bearings.

It will be seen that an operator upon the platform 34 may swing any of the lever mechanisms 38 and raise or lower the beams 37 of the plows carried by the frame 1 or the operator standing upon the same platform may swing the lever 39 and turn the lever 40 whereby the beams 42 of the plows carried by the frame 6 are raised and lowered. Brace rods 46 are provided at their ends with bearings 47 and one of the said rods has its bearings receiving the upper ends of the shafts 14 and 16 and another of the said rods has its bearings receiving the upper ends of the shafts 24 and 26. These rods serve as means for holding the upper end of the said shafts in proper relation to each other and also serve as means for preventing the said shafts from tending to bind or wear in their bearings.

Where a plurality of plow gangs are used as shown in Fig. 11, the manipulation of the lever 39 of the preceding or forward gang will actuate simultaneously all of the respective plow beams upon the respective following gangs, the connection between all of the respective preceding or intermediate gangs and the last gang being similar to the one shown in Fig. 1, containing two gangs only. Thus the manipulation of the lever 39 of the forward gang as shown in Fig. 11 will operate the beams 37 of the plows in the second gang, while the lever 39 of the second gang through the rod 45 will actuate as before described the beams 42 of the last gang.

The detail construction and operation of the plow actuating levers and shafts 39 and 41' respectively, being the subject matter of a co-pending application filed March 27, 1911, Serial No. 617,106, Patent No. 1,014,379, January 9, 1912, it is not thought necessary to describe in detail the construction and application of the rods 36 and 41 to the respective plow beams of the frame, the rods as shown in Fig. 1 being broken a short distance to the rear of their respective shafts and not shown connected to the plow beams.

Having described the invention what I claim as new and desire to secure by Letters Patent is:

1. A gear for connecting a preceding and succeeding gang frame comprising a stud carried by one of the frames and having its axis disposed at a right angle to the line of draft of the frames, a bearing mounted upon the other frame and receiving a projecting end portion of the said stud, said frames being free to swing vertically with relation to each other in the line of draft and being free to swing vertically with relation to each other at right angles to the line of draft upon the connection between the stud and the bearing as a pivot but being constrained against relative movement in other directions.

2. A connecting gear for a preceding and succeeding gang frame, comprising a stud carried by one of the frames and having a projecting end portion, a bearing carried by the other frame and receiving the projecting end portion of the stud, the frames being free to swing vertically with relation to each other in their line of draft and being free to swing vertically with relation to each other at right angles to their line of draft, and an adjustable restraining member connected at one end with the forward portion of the preceding frame and at its other with the forward portion of the succeeding frame.

3. In combination with a wheel mounted preceding frame and a wheel mounted succeeding frame, means pivotally connecting the rear portion of the preceding frame with the forward portion of the succeeding frame, a shaft journaled upon the succeeding frame, a series of plow beams operatively connected with said shaft, a lever fulcrumed upon the preceding frame, a rod connected at one end with said lever, a crank arm carried by said shaft, said rod having pivotal connection with said crank arm, said pivotal connection being located approximately vertically above and in close proximity to the pivotal connection between the said frames.

4. In combination with a wheel mounted preceding frame and a wheel mounted succeeding frame, means for simultaneously steering the wheels, means pivotally connecting the rear portion of the preceding frame with the forward portion of the succeeding frame, a shaft journaled upon the succeeding frame, a series of plow beams operatively connected with said shaft, a lever fulcrumed upon the preceding frame, a rod connected at one end with said lever, and a crank arm carried by said shaft, said rod having pivotal connection with said crank arm, said pivotal connection being located approximately vertically above and in close proximity to the pivotal connection between the said frames.

In testimony that I claim the foregoing as my own, I have hereto affixed my signature in the presence of two witnesses.

WILHELM G. DANIELSEN.

Witnesses:
W. R. DUNKEL,
C. K. SCROGGIN.